United States Patent [19]

Migdal

[11] 4,156,400
[45] May 29, 1979

[54] ANIMAL FECES DISPOSAL DEVICE

[75] Inventor: Jerome Migdal, Brooklyn, N.Y.

[73] Assignee: Marvin Migdal, Brooklyn, N.Y.

[21] Appl. No.: 801,429

[22] Filed: May 27, 1977

[51] Int. Cl.² .................... A01K 15/00; A01K 29/00
[52] U.S. Cl. ......................................................... 119/1
[58] Field of Search ............................................ 119/1

[56] References Cited
U.S. PATENT DOCUMENTS

| 3,286,826 | 11/1966 | Stoll | 119/1 X |
| 3,626,900 | 12/1971 | Failla | 119/1 |
| 3,818,865 | 6/1974 | Sinclair | 119/1 |

Primary Examiner—Louis G. Mancene
Assistant Examiner—Daniel J. Leach
Attorney, Agent, or Firm—Blum, Moscovitz, Friedman & Kaplan

[57] ABSTRACT

An animal feces disposal device is provided. The device includes a thin flexible sheet of water repellent material which has a stiffening member centrally mounted to it. A drawstring running about the periphery of the sheet serves to close the sheet after use. The stiffening member is arranged so that the feces will be centrally positioned within the device to avoid any hand contact by the user. After use the device may be disposed of as a unit.

9 Claims, 4 Drawing Figures

U.S. Patent      May 29, 1979      4,156,400
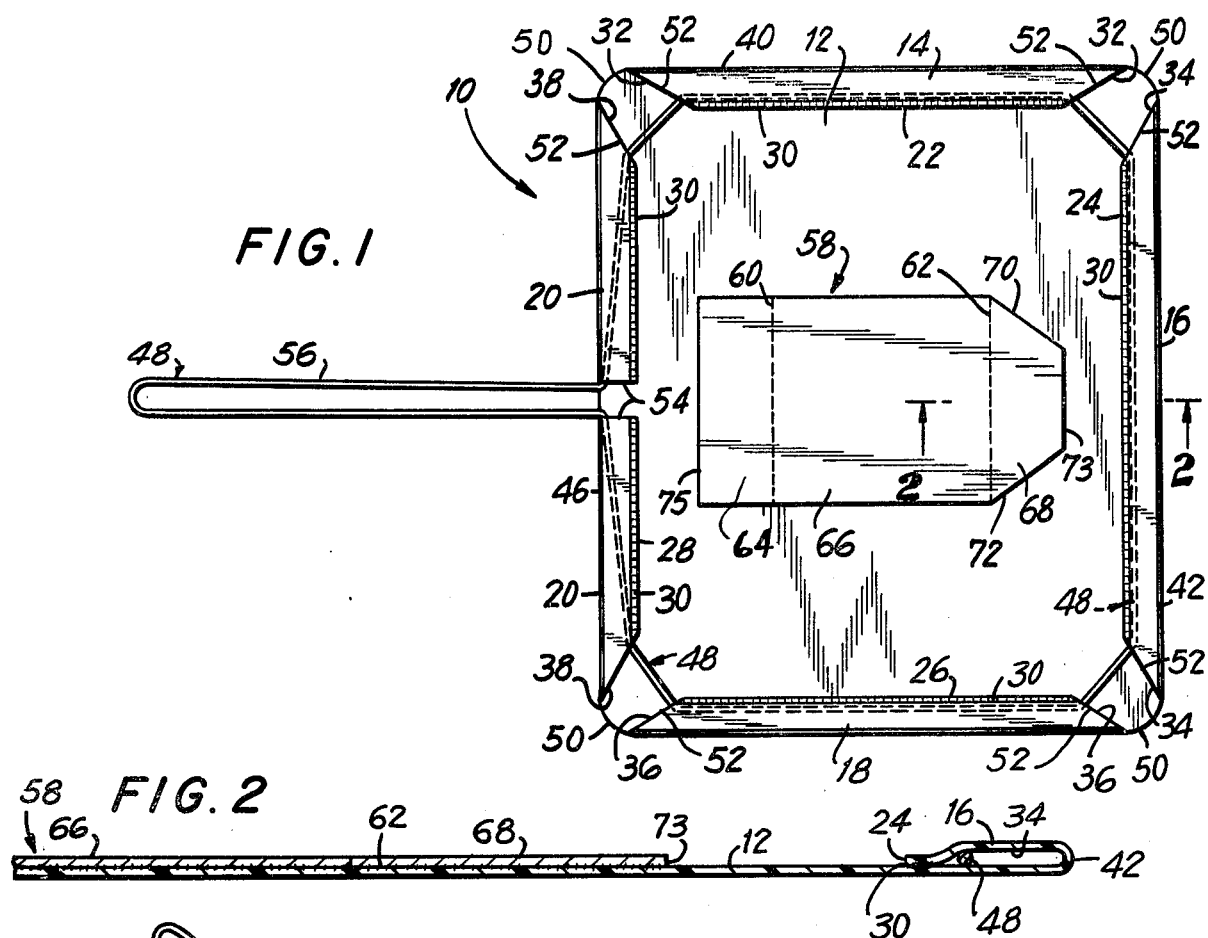
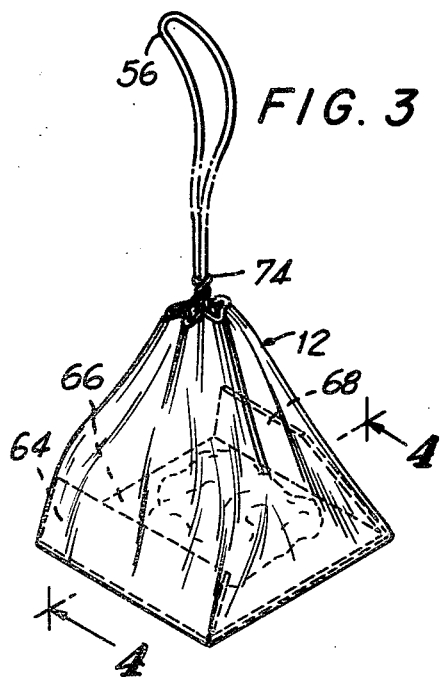
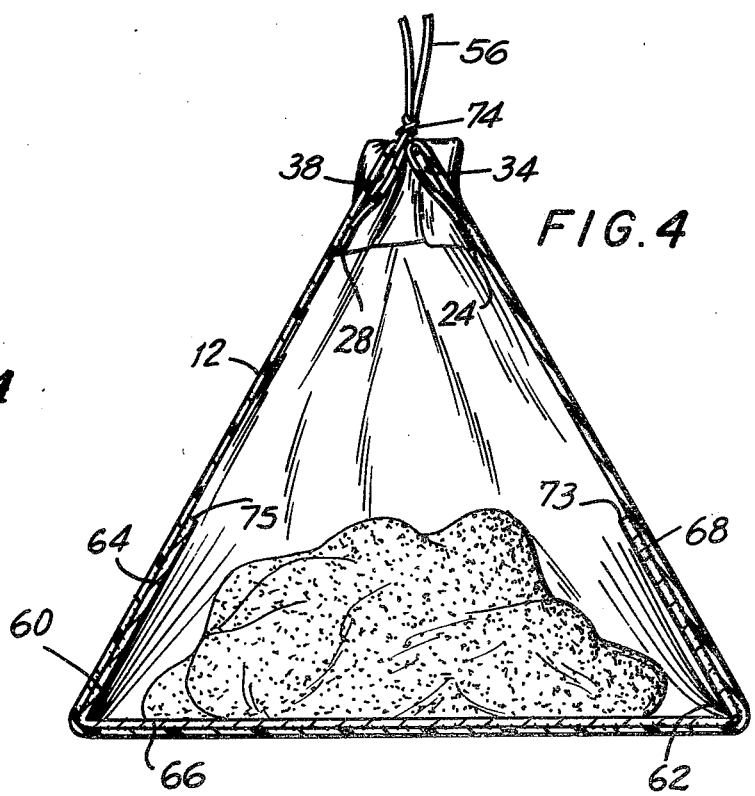

ANIMAL FECES DISPOSAL DEVICE

BACKGROUND OF THE INVENTION

This invention relates generally to an animal feces disposal device for collecting and disposing feces in a sanitary manner, in particular, the feces of a dog. In the art, a number of devices have been proposed for collecting and disposing of the feces deposited by dogs. These devices are portable so that a dog owner may carry it with him as the dog is walked. However, the proposed devices have been less than completely satisfactory in that the devices were difficult to use or the user's hands were often placed in close proximity or in contact with the feces to be disposed of. The latter is obviously unsanitary and would discourage use of such devices. The instant invention is directed to a simple and inexpensive dog feces disposal device that keeps the user's hands away from the feces contained within.

SUMMARY OF THE INVENTION

Generally speaking, in accordance with the invention, a simple and inexpensive sanitary disposal device for dog feces is provided. The device includes a thin flexible sheet of water repellent material which has a stiffening member centrally mounted to it. A drawstring running about the periphery of the sheet serves to close the sheet after use. The stiffening member is arranged so that the feces will be centrally positioned within the device to avoid any hand contact by the user. The stiffening member may be provided with a score line permitting folding of a portion thereof when said sheet is closed by the drawstring to aid in said positioning. After use, the device may be disposed of as a unit.

Accordingly, it is an object of this invention to provide an improved dog feces disposal device that prevents the user's hand from coming into contact with the fecal matter disposed within.

Another object of this invention is to provide an improved dog feces disposal device that is relatively simple and inexpensive to manufacture and use.

A further object of this invention is to provide an improved dog feces disposal device that also serves to control odor.

Another object of this invention is to provide an improved dog feces disposal device that is lightweight and easily foldable.

Still other objects and advantages of the invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawings, in which:

FIG. 1 is a top plan view of a dog feces disposal device constructed in accordance with the preferred embodiment of the instant invention;

FIG. 2 is a fragmentary sectional view taken along line 2—2 of FIG. 1.

FIG. 3 is a perspective view of the dog feces disposal device in its closed position with the fecal matter contained within; and FIG. 4 is a fragmentary sectional view taken along line 4—4 of FIG. 3.

DESCRIPTION OF THE PREFERRED EMBODIMENT

The drawings illustrate a dog feces disposal device 10 which includes a thin flexible sheet 12 constructed from suitable water repellent material such as plastic. Sheet 12 is generally rectangular in shape and along each side wall has upturned flaps 14, 16, 18 and 20 having edges 22, 24, 26 and 28 respectively, which are secured to sheet 12 by any suitable means such as a bead of adhesive 30 to define four elongated openings 32, 34, 36 and 38 between edges 22, 24, 26 and 28 of flaps 14, 16, 18, 20 and the outer edges 40, 42, 44 and 46 of sheet 12. Elongated openings 32, 34, 36 and 38 permit a drawstring 48 to be inserted therethrough. The four corners 50 of sheet 12 are rounded and each upturned flap 14, 16, 18 and 20 had a diagonally cut end wall 52 which permits drawstring 48 to pass diagonally between each elongated opening 32, 34, 36 and 38 at points proximate to each corner 50 of sheet 12. Upturned flap 20 has an opening 54 at its mid-point for permitting the tail portion 56 of drawstring 48 to extend outwardly so that it may be drawn and tied.

Centrally mounted to flexible sheet 12 is a stiffening member 58 which is constructed from material which is stiffer than that of sheet 12, such as cardboard. Stiffening member 58 has a pair of score lines 60, 62 extending perpendicularly with respect to tail portion 56 of drawstring 48 and substantially parallel to upturned flap 20. Score lines 60, 62 divide stiffening member 58 into a first panel 64 located facing but spaced from upturned flap 20, and therefore facing tail portion 56 of drawstring 48, central panel 66, and a trapezoidal shaped panel 68 having a pair of diagonally cut transverse edges 70, 72 defining an end edge 73. End edge 73 is shorter than score lines 60, 62 and end edge 75 of panel 64.

In use, dog feces disposal device 10 would be placed in an unfolded flat state as shown in FIG. 1, under a dog when the dog crouches for the purpose of defecation. After the dog has completed defecation, tail end 56 of drawstring 48 is pulled while the user grasps only that portion of sheet 12 adjacent the opening 54 of upturned flap 20, and by reason of stiffening member 58 and its score lines 60, 62 and the trapezoidal arrangement of panel 68, the feces will be centrally positioned within the device with panels 64 and 68 being folded upwardly along score lines 60, 62 respectively. As drawstring 48 is pulled the feces will completely enclose within the device and a knot 74 (FIGS. 3 and 4) may be placed in the drawstring to completely seal the device so that it may be disposed. This complete sealing provides for odor control as well as cleanliness. The arrangement of panels 64, 66 and 68 provides for centrally positioning the feces within the device so that the user's hands will not normally come in contact with the feces. The construction permitting drawstring 48 to run diagonally in the vicinity of each corner 50 of sheet 12 insures that as drawstring 48 is pulled it will smoothly and completely close sheet 12 about stiffening member 58, the score lines 60 and 62 and diagonally cut transverse edges cooperating to cause panels 64 and 68 to fold upwardly to position the feces.

Flexible sheet 12 need not be of square or rectangular shape but may be of other shapes as desired. Similarly, stiffening member 58 need not be of substantially the shape depicted. Upturned flaps 14, 16, 18 and 20 may be secured by hot sealing or other means in place of adhesive bead 30.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An animal feces disposal device comprising a flexible sheet formed with an elongated opening extending substantially about the periphery of said sheet, said opening having a slot therein, drawstring means disposed within said peripheral opening with an end thereof extending through said slot, and a stiffening member centrally mounted to said sheet, said stiffening member including score lines dividing said stiffening member into at least three panels, and said score lines being substantially perpendicularly oriented with respect to said end of said drawstring means, whereby, by drawing said end of said drawstring, said stiffening member is folded along said score lines so that the one of said three panels proximate to said drawstring end and the one of said three panels distal from said drawstring end are folded toward the panel therebetween while said sheet is closed about said stiffening member.

2. An animal feces disposal device comprising a flexible sheet, a stiffening member formed with at least one score line dividing said stiffening member into at least two panels, said stiffening member being centrally mounted to said sheet, said sheet being formed with an elongated opening along regions thereof surrounding and spaced from said stiffening member, said opening having a slot therein, and drawstring means disposed in said elongated opening and having an end thereof extending through the slot in said elongated opening, said at least one score line being substantially perpendicularly oriented with respect to said end of said drawstring means, whereby when said end of said drawstring means is drawn, said sheet is closed about said stiffening member, folding said stiffening member along said at least one score line.

3. A device as claimed in claim 2 wherein said sheet is generally four-sided and said drawstring means extends parallel to each side wall at the central portion thereof and extends diagonally with respect to each said side wall at the corner portion thereof.

4. A device as claimed in claim 2, wherein said elongated opening is formed from upturned edges of said flexible sheet and means securing said upturned edges of said flexible sheet to a point interior of said periphery of said sheet.

5. A device as claimed in claim 2, wherein corner regions of said upturned edges of said flexible sheet are cutaway to expose corner regions of said drawstring means and a central region of one of said upturned edges is cut away to permit one end of said drawstring means to enter therethrough to permit drawing of said end.

6. A device as claimed in claim 2, wherein said flexible sheet comprises plastic.

7. A device as claimed in claim 2, wherein said stiffening member comprises cardboard.

8. A device as claimed in claim 2, wherein said at least one score line divides said panel into at least two panels, the one of said at least two panels most distal from said end of said drawstring being substantially trapezoidal in shape and having an edge thereof extending substantially parallel to said score line and shorter than said score line.

9. A device as claimed in claim 8, including at least two score lines dividing said stiffening member into at least three panels, all of said score lines being substantially perpendicularly oriented with respect to said end of said drawstring means, whereby said one panel proximate said end of said drawstring means and said one panel distal of said end of said drawstring means are folded toward the panel therebetween upon the drawing of said end of said drawstring means for closing said sheet about said stiffening member.

* * * * *